United States Patent [19]

Yoshida et al.

[11] 4,238,016
[45] Dec. 9, 1980

[54] VISCOUS FLUID COUPLING DEVICE

[75] Inventors: Motoharu Yoshida, Ichinomiya; Hiroto Masai, Toyota, both of Japan

[73] Assignee: Aisin Seiki Kabushiki Kaisha, Kariya, Japan

[21] Appl. No.: 917,280

[22] Filed: Jun. 20, 1978

[30] Foreign Application Priority Data

Jun. 20, 1977 [JP] Japan ................................ 52/73034

[51] Int. Cl.³ ............................................ F16D 35/00
[52] U.S. Cl. ................................ 192/58 B; 192/82 T; 192/110 B
[58] Field of Search .............. 192/58 B, 82 T, 110 B; 308/DIG. 14

[56] References Cited

U.S. PATENT DOCUMENTS

| 3,272,188 | 9/1966 | Sabat | 192/58 B X |
| 3,359,047 | 12/1967 | Andersen | 308/DIG. 14 |
| 3,880,265 | 4/1975 | Elmer | 192/58 B |
| 3,913,713 | 10/1975 | F'Geppert | 192/111 B X |
| 4,044,729 | 8/1977 | Elmer | 192/82 T X |
| 4,074,663 | 2/1978 | Cory | 192/82 T X |

Primary Examiner—Rodney H. Bonck
Attorney, Agent, or Firm—Oblon, Fisher, Spivak, McClelland & Maier

[57] ABSTRACT

A viscous fluid coupling device for use in automotive vehicles includes a rotatable input shaft driven by an engine and a rotatable output member driven by the input shaft via shearing force of viscous fluid thereby rotating a cooling fan in unison therewith. The output member is made of aluminum alloy whose coefficient of thermal expansion is larger than that of iron. The device includes a bearing set which is interposed between the output member and a stationary member made of iron. The bearing set is braked by the output member and the stationary member thereby decreasing the rotational speed of the fan when the ambient air temperature of the engine is below a predetermined value.

5 Claims, 2 Drawing Figures

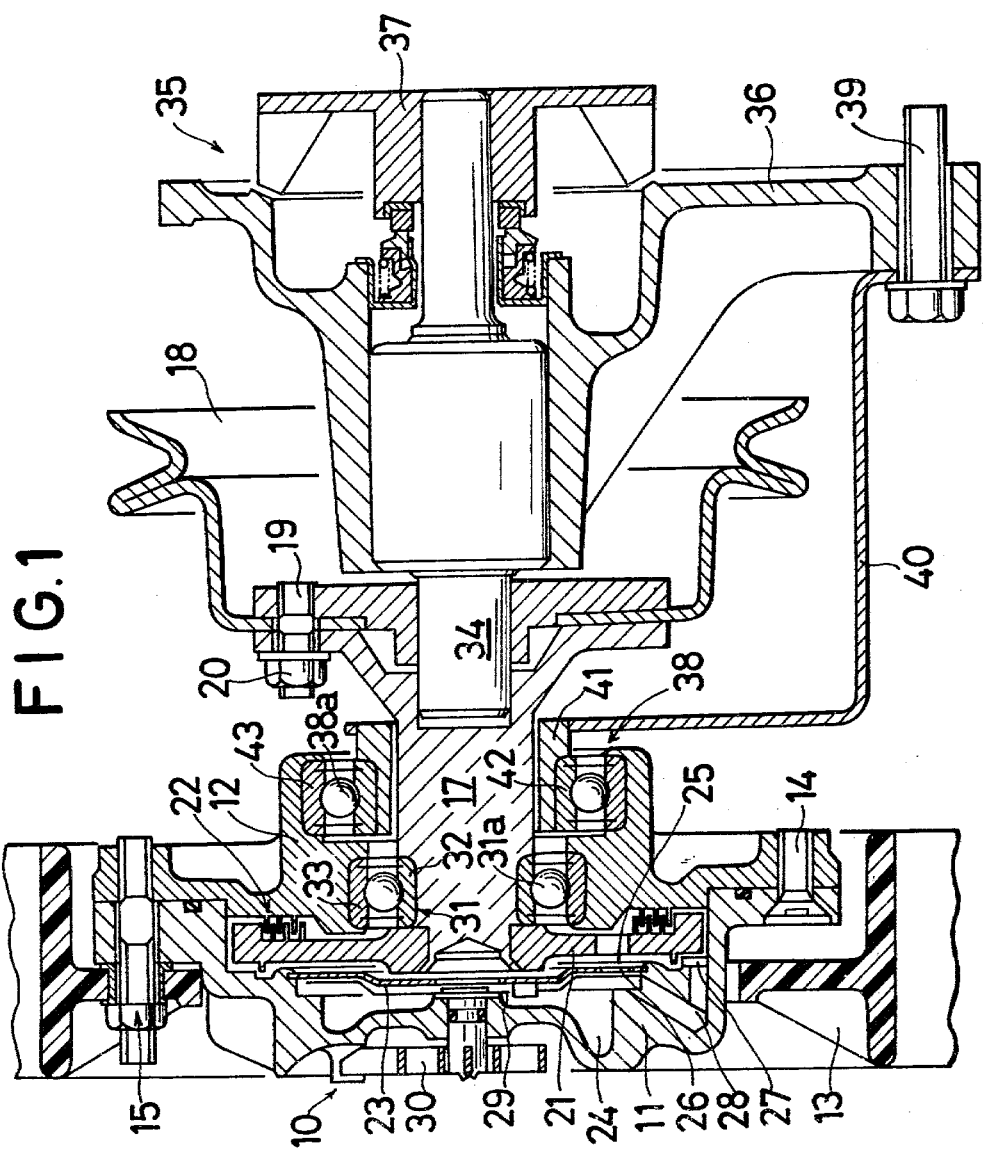

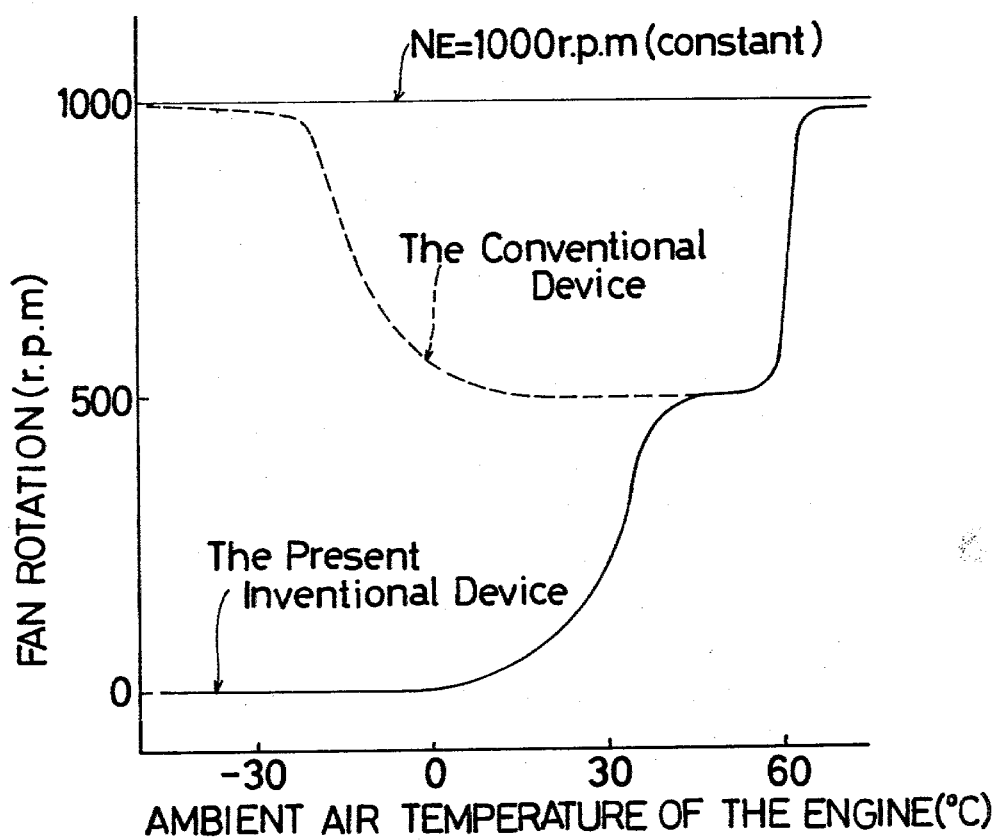

VISCOUS FLUID COUPLING DEVICE

BACKGROUND OF THE INVENTION

1. Field of the Invention

This invention relates to viscous fluid coupling devices which serve as a drive for the radiator cooling fan of a vehicle engine, and more particularly, to such coupling devices which control the drive for the fan in response to ambient air temperature of the engine.

2. Description of the Prior Art

In the vehicle engine, it is normally necessary to increase the fan rotation thereby to cool the engine when ambient air temperature is high, and to decrease the fan rotation when ambient air temperature is low. In particular, when the engine is driven at a low temperature, it is desirable to prevent the fan from rotating in order to improve the warming characteristic of the engine.

In a conventional viscous fluid coupling device, however, there are drawbacks in that the engine is excessively cooled because no means is provided for preventing the fan from rotating, or that the construction of the device comes to be complicated even if the means is provided.

SUMMARY OF THE INVENTION

Accordingly, it is an object of the present invention to provide an improved viscous fluid coupling device which may avoid by simple construction the aforementioned drawbacks enountered in the prior art.

It is another object of the present invention to provide a viscous fluid coupling device which may be braked by a simple means whose rotational torque varies in response to ambient air temperature when the temperature is below a predetermined value.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 1 is a vertical transverse sectional view of one embodiment of a viscous fluid coupling device according to the present invention;

FIG. 2 is a graph showing the characteristics of the viscous fluid coupling device of the present invention in comparison with a conventional one.

DETAILED DESCRIPTION OF THE PREFERRED EMBODIMENTS

Referring now to the drawings, especially FIG. 1 thereof, a viscous fluid coupling device 10 includes a first output member 11 and a second output member 12 which are connected to each other by a suitable connection 14. The first and second output members 11 and 12 are made of a metal material, such as an aluminum alloy, whose coefficient of thermal expansion is relatively large. A cooling fan 13 made of synthetic resin is fixed to the outer periphery of the first output member 11 by nut and bolt assembly 15, for unitary rotation therewith. A temperature responsive bimetal strip 30 is positioned in the center of the first output member 11.

An input shaft 17 made of iron is fixed to a pulley 18 by bolts 19 and nuts 20. The pulley 18 is suitably driven by the engine to provide a driving input for the coupling device 10. The input shaft 17 includes at one end thereof an input disc or rotor 21 which is fitted within the interior between the first and second output members 11, 12. A plurality of axially extending cooperating grooves and lands generally designated by reference 22 are provided on each facing surface of the rotor 21 and the second output member 12, thereby transmitting rotational torque from the rotor 21 to the output members 11, 12 upon rotation of the input shaft 17 through the shearing force of the viscous fluid within the operating chamber 25. A valve plate 23 is fixed at the outer periphery to the inside shoulder of the first outer member 11, such that the interior between the first and second outer members 11 and 12 is divided into a reservior chamber 24 and an operating chamber 25 by the valve plate 23. The rotor 21 is positioned in the operating chamber 25. Slots 26 are provided on the valve plate 23 thereby allowing fluid flow from the reservoir chamber 24 to the operating chamber 25. The fluid flow from the operating chamber 25 to the reservoir chamber 24 is accomplished by a pair of diametrically opposed pumping elements 27 which are provided on the inside wall of the first outer member 11 and axially projected toward the operating chamber 25, and by passage means 28 provided in the first outer member 11. The slots 26 of the valve plate 23 can be closed or opened by a displaceable valve arm 29 which is mechanically connected to a temperature responsive member such as bimetal strip 30. Mounted between the input shaft 17 and the second outer member 12 is a first bearing set 31 which functions as a support for the input shaft 17. An inner race 32 of the first bearing set 31 is seated on the outside diameter of the input shaft 17, while an outer race 33 of the first bearing set 31 is seated on the inside diameter of the second output member 12. A plurality of balls 31a are rotatably supported between the inner race 32 and the outer race 33.

The rotation of the pulley 18 is transmitted to an input shaft 34 of a water pump 35 having a housing 36, thereby rotating an impeller 37.

The present invention resides particularly in the provision of second bearing set 38. A stationary member 40 made of iron is fixed at one end thereof to the water pump housing 36 by bolts 39, and includes at the other end thereof a cylindrical member 41 which is coaxially arranged on the input shaft 17 with some gap. An inner race 42 of the second bearing set 38 is seated on the outside diameter portion of the cylindrical member 41, while an outer race 43 of the second bearing set 38 is seated on the inside diameter portion of the second output member 12. A plurality of balls 38a are rotatably supported between the inner race 42 and the outer race 43.

In operation, the input rotor 21 is rotated when the input shaft 17 is driven by the engine via the pulley 18. The shearing force of the viscous fluid due to the rotation of the rotor 21 transmits the torque to the first and second output members 11 and 12, thereby rotating the same. The torque to be transmitted is proportional to the shearing force of viscous fluid in the operating chamber 25. Therefore, the first and second output members 11 and 12 are rotated at a higher speed as the quantity of viscous fluid supplied to the operating chamber 25 is increased. The fluid flow from the reservoir chamber 24 to the operating chamber 25 via slots 26 is controlled by the valve arm 29 and the bimetal strip 30.

When ambient air temperature is above a predetermined value, the rotation of the input shaft 17 is transmitted to the first and second output members 11 and 12 via the rotor 21, thereby rotating the cooling fan 13.

When ambient air temperature is below a predetermined value, the second bearing set 38 acts as braking mechanism. As it is well known, the coefficient of thermal expansion of aluminum alloy is larger than that of the coefficient of thermal expansion of iron. As a result, when ambient air temperature is below a predetermined value, the second output member 12 made of aluminum alloy is compressed thereby locking the second bearing set 38. Accordingly, both the rotational torque transmitted to the second output member 12 via the first bearing set 31 and the rotational torque transmitted to the first and second output members 11 and 12 via the rotor 21 are locked by the stationary member 40 via the second bearing set 38. As a result, when the ambient air temperature is below a predetermined value, the rotation of the cooling fan 13 is prevented and the warming characteristics of the engine are not affected.

Referring to FIG. 2, there is graphically illustrated the characteristics of the viscous fluid coupling device 10. Along the abscissa of the graph the ambient air temperature of the engine is plotted, and along the ordinate of the graph the rotational speed of the fan 13 is plotted under the condition wherein the rotation of the engine is kept constant ($N_E$=1000 r.p.m.). As is apparent from the above result, the rotational speed of the fan 13 is decreased and becomes zero when the ambient air temperature is below a predetermined value (0° C.) as indicated by a solid line. According to the conventional device which has no second bearing set, the first bearing set 31 is locked when the ambient air temperature is below the predetermined value, thereby transmitting the rotational torque of the input shaft 17 to the second output member 12. Accordingly, the rotational speed of the fan 13 is increased as indicated by the dotted line.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A viscous fluid coupling device for driving a cooling fan of a vehicle, comprising an input shaft including a rotor and driven by an engine, output means connected to said cooling fan and made of a metal material whose coefficient of thermal expansion is relatively large, a valve plate dividing an interior of said output means into a reservoir chamber and an operating chamber in which said rotor is positioned, said reservoir chamber being in communication with said operating chamber, said rotor and said output means having opposed spaced surfaces providing a fluid shear space therebetween and cooperable with a viscous fluid in said shear space in order to transmit rotational torque from said rotor to said output means, a first bearing set interposed between said input shaft and said output means, a stationary member secured to a fixed part of the vehicle and made of a metal material whose coefficient of thermal expansion is relatively small, and a second bearing set interposed between said output means and said stationary member;

whereby, at a temperature of a predetermined value, the output means is compressed thereby locking the second bearing set such that said second bearing set acts as a braking mechanism preventing rotation of the cooling fan.

2. The viscous fluid coupling device according to claim 1, wherein said stationary member includes a cylindrical member arranged coaxially with said input shaft, and said second bearing set is interposed between said output means and said cylindrical member.

3. The viscous fluid coupling device according to claim 1, wherein said fixed part is a water pump housing.

4. The viscous fluid cooling device according to claim 1, wherein said output means is made of an aluminum alloy.

5. The viscous fluid cooling device according to claim 1, wherein said stationary member is made of iron.

* * * * *